No. 616,771. Patented Dec. 27, 1898.
J. F. COOK.
VEHICLE STANDARD.
(Application filed May 13, 1898.)

(No Model.)

WITNESSES:
Donn Twitchell
Rev. G. Hoster

INVENTOR
J. F. Cook.
BY
ATTORNEYS.

THE NORRIS PETERS CO., PHOTO-LITHO., WASHINGTON, D. C.

UNITED STATES PATENT OFFICE.

JOHN F. COOK, OF LEON, IOWA.

VEHICLE-STANDARD.

SPECIFICATION forming part of Letters Patent No. 616,771, dated December 27, 1898.

Application filed May 13, 1898. Serial No. 680,572. (No model.)

*To all whom it may concern:*

Be it known that I, JOHN F. COOK, of Leon, in the county of Decatur and State of Iowa, have invented a new and Improved Vehicle-Standard, of which the following is a full, clear, and exact description.

The object of the invention is to provide a new and improved vehicle-standard which is simple and durable in construction arranged to securely fasten the socket in place on the bolster and to permit of conveniently removing the upright or stake on the socket whenever it is desired to load or unload heavy or large articles, such as a wagon-box, hay-rack, water-tank, logs, &c.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the figures.

Figure 1:
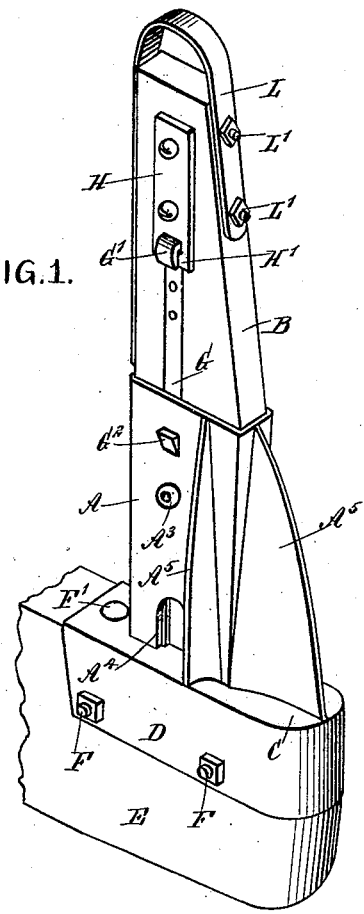
Figure 4:
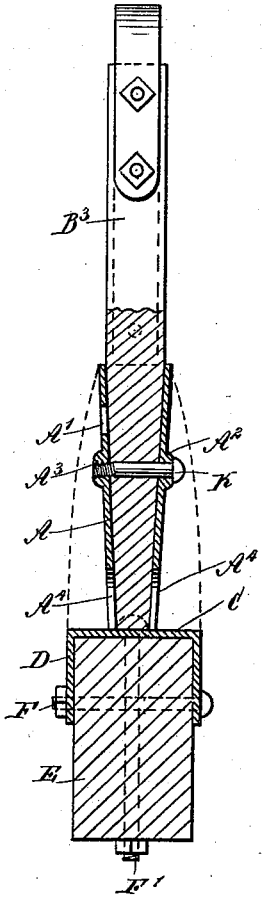
Figure 2:
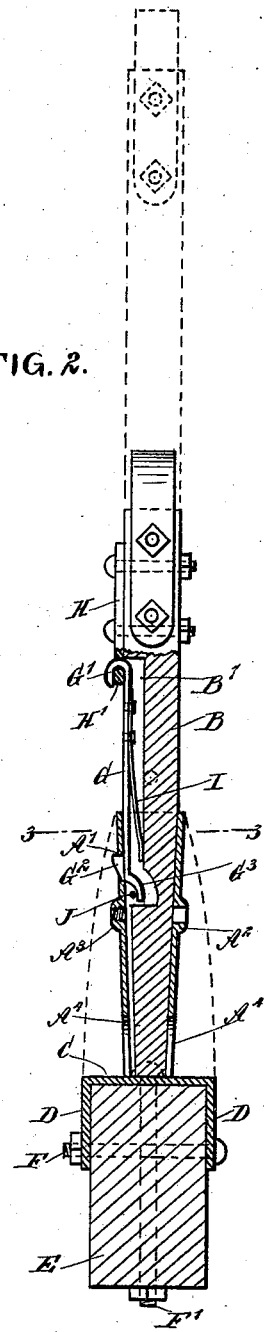
Figure 3:
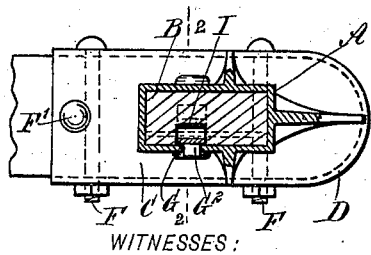

Figure 1 is a perspective view of the improvement as applied. Fig. 2 is a transverse section of the same on the line 2 2 of Fig. 3. Fig. 3 is a sectional plan view of the same on the line 3 3 of Fig. 2, and Fig. 4 is a cross-section of a modified form of the improvement.

The improved vehicle-standard is provided with a metallic socket A, slightly contracted at its lower end and adapted to receive the lower end of an upright or stake B, usually made of wood. The socket A is provided with a base C, formed with a U-shaped depending flange D, adapted to engage the sides and end of the bolster E, on which the standard is to be used. Bolts F extend transversely through the sides of the flange D and the bolster, and a bolt F' extends vertically through the base C and the bolster to securely fasten the base and its flange, together with the socket A, in position on the end of the bolster E.

In order to removably secure the upright or stake B in place in the socket A, I provide a fastening device comprising a hook G, extending in a groove B', formed on one side of the upright B, and the upper end of said hook G is formed with an open eye G', hung on a pin H', formed in a plate H, secured to the upright B by screws, rivets, or bolts, as shown in Figs. 1 and 2. The lower end of the hook G is formed with a wedge-shaped shoulder $G^2$, adapted to snap into an opening A', formed on one of the sides of the socket A, said hook being pressed outward by a spring I, fastened to the hook and resting with its free end against the stake B on the back wall of the groove B'. The hook G is further provided with a curved extension $G^3$ at or near the wedge-shaped shoulder $G^2$ to engage a pin J, secured longitudinally in the stake to prevent the hook G from moving too far outward—that is, out of the groove B' when the stake is detached from the socket A.

When the several parts are in the position shown in Figs. 1, 2, and 3 and it is desired to remove the upright or stake G from the socket A, then the operator takes hold of the upright above the socket and presses with one finger against the hook G, so as to swing the same inward from the eye G' as the fulcrum to disengage the shoulder $G^2$ from the upper wall of the opening A'. An upward pull on the stake B now moves the lower end of the upright out of the socket. When it is desired to replace the stake or upright, its lower end is simply pushed down into the socket, so that the shoulder $G^2$ snaps into the opening A' and securely locks the stake in place.

If desired, an ordinary stake $B^3$ without a fastening device, as described, may be used in connection with the socket A, as illustrated in Fig. 4. In this case a bolt K is employed, passed through an apertured lug $A^2$ and through a registering opening in the stake and screwed into a threaded lug $A^3$, formed on the opposite side of the socket, as will be readily understood by reference to Fig. 4. In case the upright or stake sticks in the socket it can be readily pried upward after the hook G is pressed inward, as before mentioned. By inserting a tool through an opening $A^4$, formed in the side of the socket, it engages the extreme lower end of the upright and loosens the same in its seat in the socket. Ribs $A^5$ integrally connect the base C with the sides and outer end of the socket A, so as to greatly strengthen the latter. The upper end of the stake B is preferably reinforced by a suitable band L, fastened in place by bolts L'.

It will be seen that the device is very simple and durable in construction, permits of securely fastening the socket in place on the bolster, and allows of conveniently removing the upright or stake from the socket whenever it is desired to load or unload heavy or large articles, and, if desired, longer or shorter stakes can be readily used in the socket, according to the nature of the load.

It is understood that the socket B, base C, and depending flange D, together with the ribs $A^5$, are integrally parts of a single casting, and hence can be very cheaply manufactured.

Having thus fully described my invention, I claim as new and desire to secure by Letters Patent—

1. A vehicle-standard provided with a socket formed with a base adapted to rest on the top of a bolster, and having a depending flange for engagement with the sides and end of the bolster, bolts for fastening said base and flange to the bolster and an upright or stake removably placed in the socket, substantially as shown and described.

2. A vehicle-standard provided with a socket formed with a base adapted to rest on the top of a bolster, a depending flange integral with the base and adapted to engage the sides and ends of the bolster, strengthening-ribs integrally connecting the said base with the said socket, and an upright or stake removably placed in the socket, substantially as shown and described.

3. A vehicle-standard provided with a socket formed with a base adapted to rest on the top of a bolster, a depending flange integral with the base and adapted to engage the sides and ends of the bolster, strengthening-ribs integrally connecting the said base with the said socket, bolts engaging said base and flange for fastening the socket in place on the bolster, and an upright or stake removably placed in the socket, as set forth.

4. A vehicle-standard comprising a socket, an upright removably held in said socket, and a fastening device for fastening said upright in place in said socket, the fastening device comprising a spring-pressed hook pivoted on a stake and provided with a wedge-shaped shoulder adapted to engage an opening or keeper in said socket, substantially as shown and described.

5. A vehicle-standard comprising a socket, an upright removably held in said socket, a fastening device for fastening said upright in place in said socket, the fastening device comprising a spring-pressed hook pivoted on a stake and provided with a wedge-shaped shoulder adapted to engage an opening or keeper in said socket, and means for limiting the outward swinging motion of said hook, as set forth.

JOHN F. COOK.

Witnesses:
HORACE FARQUHAR,
C. M. KOHLER.